(12) United States Patent
Ogasawara et al.

(10) Patent No.: US 10,920,009 B2
(45) Date of Patent: Feb. 16, 2021

(54) THERMOSETTING RESIN COMPOSITION, SHEET-MOLDING COMPOUND AND PRODUCTION METHOD THEREFOR, AND FIBER-REINFORCED COMPOSITE MATERIAL

(71) Applicant: MITSUBISHI CHEMICAL CORPORATION, Chiyoda-ku (JP)

(72) Inventors: Hayato Ogasawara, Chiyoda-ku (JP); Yuji Kazehaya, Chiyoda-ku (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 16/151,563

(22) Filed: Oct. 4, 2018

(65) Prior Publication Data

US 2019/0031817 A1    Jan. 31, 2019

Related U.S. Application Data

(63) Continuation of application No. PCT/JP2016/088551, filed on Dec. 22, 2016.

(30) Foreign Application Priority Data

Apr. 6, 2016  (JP) ................................ 2016-076815
Oct. 24, 2016 (JP) ................................ 2016-208130

(51) Int. Cl.
| | |
|---|---|
| *C08G 59/17* | (2006.01) |
| *C08J 5/24* | (2006.01) |
| *C08G 18/73* | (2006.01) |
| *C08G 18/76* | (2006.01) |
| *C08G 18/67* | (2006.01) |
| *C08G 18/75* | (2006.01) |
| *C08G 18/79* | (2006.01) |
| *C08K 3/013* | (2018.01) |
| *C08J 5/04* | (2006.01) |
| *C08J 5/18* | (2006.01) |
| *C08K 5/13* | (2006.01) |

(52) U.S. Cl.
CPC ..... *C08G 59/1466* (2013.01); *C08G 18/6705* (2013.01); *C08G 18/73* (2013.01); *C08G 18/755* (2013.01); *C08G 18/765* (2013.01); *C08G 18/7621* (2013.01); *C08G 18/7642* (2013.01); *C08G 18/7671* (2013.01); *C08G 18/797* (2013.01); *C08J 5/04* (2013.01); *C08J 5/18* (2013.01); *C08J 5/24* (2013.01); *C08K 3/013* (2018.01); *C08K 5/13* (2013.01); *C08J 2300/24* (2013.01); *C08J 2363/04* (2013.01); *C08J 2457/00* (2013.01); *C08J 2461/10* (2013.01); *C08J 2475/04* (2013.01)

(58) Field of Classification Search
CPC ...... C08K 3/013; C08K 5/13; C08G 18/6705; C08G 18/73; C08G 18/755; C08G 18/7621; C08G 18/7642; C08G 18/765; C08G 18/7671; C08G 18/797; C08G 59/1466; C08J 5/18; C08J 5/24; C08J 2300/24; C08J 2363/04; C08J 2461/10; C08J 2475/04; C08J 5/04; C08J 2457/00
USPC ......................................................... 525/530
See application file for complete search history.

(56) References Cited

U.S. PATENT DOCUMENTS

| | | | |
|---|---|---|---|
| 4,107,229 A | 8/1978 | Tideswell et al. | |
| 4,690,987 A | 9/1987 | Sakakibara et al. | |
| 5,756,600 A | 5/1998 | Okumura et al. | |
| 2006/0270810 A1* | 11/2006 | Yasumura | H01M 8/106 525/529 |
| 2008/0029215 A1 | 2/2008 | Delfino et al. | |
| 2011/0316661 A1 | 12/2011 | Muraki et al. | |
| 2013/0000841 A1 | 1/2013 | Delfino et al. | |

FOREIGN PATENT DOCUMENTS

| | | |
|---|---|---|
| JP | 59-500969 A | 5/1984 |
| JP | 60-24810 A | 2/1985 |
| JP | 62-106916 A | 5/1987 |
| JP | 63-1332 A | 1/1988 |
| JP | 4-59336 A | 2/1992 |
| JP | 4-161414 A | 6/1992 |
| JP | 9-110948 A | 4/1997 |
| JP | 2003-137965 A | 5/2003 |
| JP | 2005-187780 A | 7/2005 |

(Continued)

OTHER PUBLICATIONS

Extended European Search Report dated Mar. 28, 2019 in Patent Application No. 16897982,1, 5 pages.

(Continued)

*Primary Examiner* — David T Karst
(74) *Attorney, Agent, or Firm* — Oblon, McClelland, Maier & Neustadt, L.L.P.

(57) ABSTRACT

The thermosetting resin composition according to an embodiment of the present invention contains a component (A) which is a novolac vinyl ester resin having a hydroxyl group and an ethylenically unsaturated group in the molecule, a component (B) which is an ethylenically unsaturated monomer, and a component (D) which is a polyisocyanate compound, wherein the component (A) has a hydroxyl value of 30-150 mgKOH/g, and the mole number of the hydroxyl group with respect to the mole number of the ethylenically unsaturated group per gram of the component (A) ((the amount of the hydroxyl group [mol/g])/(the amount of the ethylenically unsaturated group [mol/g])) is 0.1-0.8.

19 Claims, No Drawings

(56) References Cited

FOREIGN PATENT DOCUMENTS

| JP | 2005-247879 A | 9/2005 |
| JP | 2008-505238 A | 2/2008 |
| JP | 2012-7081 A | 1/2012 |
| WO | WO 84/00173 A1 | 1/1984 |
| WO | WO 2005/087831 A1 | 9/2005 |
| WO | WO 2016/039326 A1 | 3/2016 |

OTHER PUBLICATIONS

Office Action dated Aug. 29, 2017 in Japanese Patent Application No. 2017-501721 (with English language translation).
International Search Report dated Mar. 7, 2017 in PCT/JP2016/088551.
International Preliminary Report on Patentability and Written Opinion dated Oct. 18, 2018 in PCT/JP2016/088551.
Office Action dated Jul. 3, 2020, in Chinese Patent Application No. 201680084207.9, filed Dec. 22, 2016, (with English Translation.).

\* cited by examiner

THERMOSETTING RESIN COMPOSITION, SHEET-MOLDING COMPOUND AND PRODUCTION METHOD THEREFOR, AND FIBER-REINFORCED COMPOSITE MATERIAL

TECHNICAL FIELD

The present invention relates to a thermosetting resin composition containing a novolac vinyl ester resin, and a sheet-molding compound obtained by using the same and a molded article thereof (fiber-reinforced composite material).

BACKGROUND ART

Conventionally, a fiber-reinforced composite material containing a thermosetting resin composition, reinforced fibers, a filler, and the like is widely used in members for electrical and electronic equipment, building materials, members for vehicles, and the like since the fiber-reinforced composite material may provide mechanical strength to ease of processability, corrosion resistance, and weight saving of plastic.

The fiber-reinforced composite material is produced by various methods, and for example, a method is widely used in which a prepreg that is a reinforced fiber base material in which a thermosetting resin composition is impregnated in advance is prepared, and the prepreg is laminated and then cured by heating.

Meanwhile, in production of a molded article having a complicated shape with fine concavities and convexities that is difficult to produce in molding using the prepreg, a sheet-molding compound (hereinafter, referred to as "SMC") is widely used. Reinforced fibers having a shorter fiber length than reinforced fibers generally used in the prepreg are used in the SMC. When such short reinforced fibers are used, the SMC easily flows in a molding die at the time of molding. For this reason, the SMC can also match a die having a fine concavo-convex shape.

Further, in the SMC, carbon fibers excellent in specific strength and specific rigidity are widely used since a molded article (fiber-reinforced composite material) can be largely decreased in weight. Meanwhile, in a thermosetting resin, a thermosetting resin composition containing an unsaturated polyester resin, an epoxy acrylate resin (also referred to as a vinyl ester resin), or the like is widely used and is examined for practical use in various fields.

In recent years, in order to develop the molded article to high-strength application, a vinyl ester resin is widely used in terms of a favorable balance among mechanical properties, fluidity, and the like. Further, in order to develop the molded article to high-heat resistance application, among vinyl ester resins, particularly, a novolac vinyl ester resin having a high unsaturated group density is widely used (for example, Patent Literatures 1 and 2).

Incidentally, in many cases, a thickener is used in a curable resin composition used in the SMC in order to improve the handleability of the SMC. In a case where the thermosetting resin includes a thermosetting resin containing a hydroxyl group, a carboxyl group, and the like, such as the unsaturated polyester resin and the vinyl ester resin described above, as the thickener, an alkaline-earth metal salt typified by MgO or CaO, a metal hydrate, an isocyanate-based thickener, and the like are used. Of them, it is known that by using an isocyanate-based thickener, an SMC can be easily thickened and an SMC having excellent handleability is obtained (for example, Patent Literatures 3 and 4).

CITATION LIST

Patent Literature

Patent Literature 1: JP 2005-247879 A
Patent Literature 2: JP 62-106916 A
Patent Literature 3: JP 60-24810 B
Patent Literature 4: JP 63-1332 B
Patent Literature 5: JP 4-161414 A

SUMMARY OF THE INVENTION

Problem to be Solved by the Invention

However, in a case where an SMC is produced by using a thermosetting resin composition containing a novolac vinyl ester resin and an isocyanate-based thickener, responsiveness between a hydroxyl group of the novolac vinyl ester resin and the isocyanate-based thickener is sharp, and a mixing ratio range in which a balance between handleability and fluidity of the SMC can be achieved, that is, a production range is narrow (also expressed as "being inferior in thickening stability"). For this reason, only by the mixing ratio between the thermosetting resin containing a novolac vinyl ester resin and the isocyanate-based thickener moving slightly back and forth with respect to the optimal range, the fluidity of the SMC is significantly decreased or the handleability of the SMC becomes difficult.

As a countermeasure, for example, it is considered to decrease the hydroxyl group density of the novolac vinyl ester resin. As an example, it is mentioned that a ratio of unsaturated monobasic acid, which is caused to act on an epoxy group of the novolac epoxy resin, is decreased at the time of synthesizing the novolac vinyl ester resin. In addition, as another method, it is known that in order to improve curability, adhesiveness, and heat resistance of the resin composition, the hydroxyl group of the vinyl ester resin is modified by causing monoisocyanate to act on the total amount of the hydroxyl group of the vinyl ester resin (for example, Patent Literature 5).

However, the former method is not enough to exhibit excellent heat resistance of the novolac vinyl ester resin. The reason for this is that while the hydroxyl group density of the novolac vinyl ester resin to be obtained is decreased, the ethylenically unsaturated group density is also decreased at the same time. In the latter method, since most of the hydroxyl group is modified with monoisocyanate, isocyanate thickening cannot be performed and the resin composition is difficult to use as a thermosetting resin composition for the SMC. In addition, it has not been reported before that the SMC is produced by using this method, and there is neither description nor suggestion also in Patent Literature 5.

From such circumstances, there are demands for a novolac vinyl ester resin which has excellent handleability and fluidity as an SMC and is excellent in thickening stability and by which isocyanate thickening can be performed, an SMC produced by using a thermosetting resin composition containing the novolac vinyl ester resin, and a molded article of the SMC.

An object of an embodiment of the invention is to provide a thermosetting resin composition which has easy handleability and favorable fluidity as an SMC and is excellent in thickening stability at the time of isocyanate thickening and excellent in heat resistance by maintaining an ethylenically unsaturated group density derived from a novolac vinyl ester resin even when an SMC is produced by using a novolac vinyl ester resin and an isocyanate-based thickener, an SMC produced by using the thermosetting resin composition, and a molded article thereof.

Means for Solving Problem

The present inventors have conducted intensive studies to solve the above-described problems, and as a result, they have found that the above-described problems can be solved by setting a hydroxyl value of a novolac vinyl ester resin and a ratio calculated from a hydroxyl group and an ethylenically unsaturated group to a specific range, thereby completing the invention. That is, the gist of an embodiment of the invention lies in the following.

In order to solve the above-described problems, a thermosetting resin composition according to an embodiment of the invention contains:

a component (A): a novolac vinyl ester resin having a hydroxyl group and an ethylenically unsaturated group in the molecule;

a component (B): an ethylenically unsaturated monomer; and a component (D): a polyisocyanate compound, in which a hydroxyl value of the component (A) is 150 mgKOH/g or less, and the mole number of the hydroxyl group with respect to the mole number of the ethylenically unsaturated group per 1 g of the component (A), that is, "(the amount of the hydroxyl group [mol/g])/(the amount of the ethylenically unsaturated group [mol/g])" is less than 1.

Further, a sheet-molding compound according to an embodiment of the invention contains a thickened product of the thermosetting resin composition according to the embodiment of the invention and a component (C): a reinforced fiber bundle having a fiber length of 5 mm or more and 120 mm or less.

Further, a method for producing a sheet-molding compound according to an embodiment of the invention includes:

a step (i-1) of dissolving a component (A'): a novolac vinyl ester resin having a hydroxyl group and an ethylenically unsaturated group in the molecule and having a hydroxyl value of more than 150 mgKOH/g in a component (B): an ethylenically unsaturated monomer and then mixing a component (E): monoisocyanate to react the resulting mixture;

a step (i-2) of obtaining a thermosetting resin composition by mixing a component (D): a polyisocyanate compound with a reaction product obtained in the step (i-1);

a step (i-3) of obtaining a sheet-molding compound precursor by impregnating the thermosetting resin composition obtained in the step (i-2) in a component (C): a reinforced fiber bundle having a fiber length of 5 mm or more and 120 mm or less; and a step (i-4) of thickening the thermosetting resin composition in the sheet-molding compound precursor, in which the reaction product obtained in the step (i-1) contains a component (A).

The component (A) is a novolac vinyl ester resin having a hydroxyl group and an ethylenically unsaturated group in the molecule, a hydroxyl value of the component (A) is 150 mgKOH/g or less, and the mole number of the hydroxyl group with respect to the mole number of the ethylenically unsaturated group per 1 g, that is, "(the amount of the hydroxyl group [mol/g])/(the amount of the ethylenically unsaturated group [mol/g])" is less than 1.

Further, a fiber-reinforced composite material according to an embodiment of the invention is a cured product of the sheet-molding compound according to the invention.

Effect of the Invention

According to the embodiment of the invention, an effect is exhibited that it is possible to provide a thermosetting resin composition, which has excellent easy handleability and favorable fluidity as an SMC and is excellent in thickening stability at the time of isocyanate thickening and excellent in heat resistance even when an SMC is produced by using a novolac vinyl ester resin and an isocyanate-based thickener, an SMC produced by using the thermosetting resin composition, and a molded article thereof.

Incidentally, the term "thickening stability" in this specification means a state of having tackiness and drape properties suitable for handling an SMC and having sufficient fluidity at the time of molding by setting a viscosity of the thickened thermosetting resin composition contained in the SMC in an appropriate range. In addition, the expression "excellent in thickening stability" means that an allowable range of the content of the component (D): a polyisocyanate compound which provides a thickening stable state in the thermosetting resin composition is sufficiently wide.

MODE(S) FOR CARRYING OUT THE INVENTION

A thermosetting resin composition according to an embodiment of the invention contains: a component (A): a novolac vinyl ester resin having a hydroxyl group and an ethylenically unsaturated group in the molecule; a component (B): an ethylenically unsaturated monomer; and a component (D): a polyisocyanate compound, in which a hydroxyl value of the component (A) is 150 mgKOH/g or less, and the mole number of the hydroxyl group with respect to the mole number of the ethylenically unsaturated group per 1 g of the component (A), that is, "(the amount of the hydroxyl group [mol/g])/(the amount of the ethylenically unsaturated group [mol/g])" is less than 1.

Further, the thermosetting resin composition according to the invention may contain a component (F): a bisphenol type vinyl ester resin or a modified bisphenol type vinyl ester resin and a component (G): a polymerization initiator. Further, the component (A) may be produced by reacting a component (A'): a novolac vinyl ester resin with a component (E): monoisocyanate. Hereinafter, respective components will be described in detail.

[Component (A)]

The component (A) is a novolac vinyl ester resin having a hydroxyl group and an ethylenically unsaturated group in the molecule, a hydroxyl value of the component (A) is 150 mgKOH/g or less, and the mole number of the hydroxyl group with respect to the mole number of the ethylenically unsaturated group per 1 g, that is, "(the amount of the hydroxyl group [mol/g])/(the amount of the ethylenically unsaturated group [mol/g])" is less than 1. By containing the component (A), an SMC which is excellent in mechanical properties and heat resistance can be obtained.

The novolac vinyl ester resin is obtained by reacting a novolac epoxy resin with an unsaturated monobasic acid or is obtained by further modifying the resulting product.

Examples of the novolac epoxy resin include halogenated novolac and an epoxy resin obtained by reaction between epichlorohydrin and methyl epichlorohydrin. Examples of the halogenated novolac include phenol novolac, cresol novolac, and brominated phenol novolac. These novolac epoxy resins may be used singly or in combination of two or more kinds thereof.

Examples of the unsaturated monobasic acid include acrylic acid, methacrylic acid, cinnamic acid, crotonic acid, sorbic acid, monomethyl malate, monopropyl malate, monobutyl malate, and mono(2-ethylhexyl) malate. These unsaturated monobasic acids may be used singly or in combination of two or more kinds thereof. Of them, acrylic acid and methacrylic acid are suitably used.

The lower limit of the hydroxyl value of the component (A) is preferably 30 mgKOH/g or more, more preferably 40 mgKOH/g or more, and particularly preferably 50 mgKOH/g or more. In addition, the upper limit of the hydroxyl value is 150 mgKOH/g or less. Further, the hydroxyl value is more preferably 140 mgKOH/g or less and particularly preferably 100 mgKOH/g or less.

The lower limit of a functional group ratio calculated from the mole number of the hydroxyl group with respect to the mole number of the ethylenically unsaturated group per 1 g of the component (A), that is, "(the amount of the hydroxyl group [mol/g])/(the amount of the ethylenically unsaturated group [mol/g])" (hereinafter, simply referred to as the "functional group ratio") is not particularly limited, but is preferably 0.1 or more and more preferably 0.15 or more. In addition, the upper limit is less than 1, more preferably 0.8 or less, and more preferably 0.7 or less.

When the hydroxyl value exceeds 150 mgKOH/g, the hydroxyl group density is high and thus thickening stability tends not to be achieved.

When the hydroxyl value is 30 mgKOH/g or more, the stickiness of the SMC is easy to thicken to a level at which handleability can be said to be favorable. In addition, a time for thickening can be shortened. Thus, mass productivity is improved.

When the hydroxyl value is 150 mgKOH/g or less and the functional group ratio is 0.1 or more, the ethylenically unsaturated group density becomes suitable density. Thus, a cured product of the SMC is prevented from becoming hard and brittle and the mechanical properties of a cured product of such a thermosetting resin become favorable.

In a case where the hydroxyl value is 150 mgKOH/g or less and the functional group ratio is 0.8 or less, since the ethylenically unsaturated group density is properly high, the mechanical properties of the cured product of the SMC containing such a thermosetting resin become favorable.

In a case where the hydroxyl value is 30 mgKOH/g or more and the functional group ratio is 0.1 or more, the stickiness of the SMC is easier to thicken to a level at which handleability can be said to be favorable. In addition, the time for thickening can be further shortened. Thus, productivity is further improved. In a case where the hydroxyl value is 30 mgKOH/g or more and the functional group ratio is 0.8 or less, since the crosslinking density becomes favorable when the thermosetting resin is cured, a sufficient amount of the ethylenically unsaturated group can be introduced at a synthesis stage of the novolac vinyl ester resin. Thus, an SMC which has further favorable mechanical properties and heat resistance can be obtained.

In a case where the hydroxyl value exceeds 150 mgKOH/g and the functional group ratio is 1 or more, the hydroxyl group density is high and thus thickening stability is not achieved. In addition, it is necessary to introduce a skeleton having a large number of the ethylenically unsaturated group into a side chain or the like of the novolac vinyl ester resin. However, when such a unit is incorporated, the viscosity at the time of mixing the component (A) with the component (B) tends to become too high. When the SMC is produced using such a thermosetting resin composition, impregnation into reinforced fibers is difficult and the content of reinforced fibers tends to decrease. Thus, a cured product (fiber-reinforced composite material) having desired mechanical properties tends not to be obtained.

Incidentally, the mole number of the ethylenically unsaturated group per 1 g of the component (A) is preferably 2.5 mmol/g or more and 6.0 mmol/g or less and more preferably 3.5 mmol/g or more and 5.0 mmol/g or less. When the mole number of the ethylenically unsaturated group is set to 2.5 mmol/g or more, a cured product (fiber-reinforced composite material) of the SMC produced using the component (A) can have sufficiently high heat resistance, which is preferable. In addition, when the mole number of the ethylenically unsaturated group is set to 6.0 mmol/g or less, a fiber-reinforced composite material to be obtained is prevented from being hard and brittle and has high mechanical properties, which is preferable.

As a means for obtaining the component (A), the following two schemes are exemplified.

(Scheme 1): a method of controlling the contents of the hydroxyl group and the ethylenically unsaturated group by controlling a reaction ratio between the novolac epoxy resin and the unsaturated monobasic acid at a synthesis stage of the novolac vinyl ester resin (Scheme 2): a method of controlling the contents of the hydroxyl group and the ethylenically unsaturated group by synthesizing a component (A'): a novolac vinyl ester resin having a hydroxyl group and an ethylenically unsaturated group in the molecule and having a hydroxyl value of more than 150 mgKOH/g and then modifying the novolac vinyl ester resin at the subsequent step The reaction ratio of (Scheme 1) is controlled by a ratio when the unsaturated monobasic acid is caused to act on the novolac epoxy resin. Typically, by causing the unsaturated monobasic acid to act on the novolac epoxy resin, the epoxy group is ring-opened to perform generation of the hydroxyl group and introduction of the ethylenically unsaturated group. For this reason, in a case where the hydroxyl value is set in the range of the invention, the ethylenically unsaturated group density inevitably decreases. Thus, the after-described Scheme 2 is excellent from the viewpoint of easily obtaining the component (A) of the invention. Incidentally, regarding the SMC obtained by using the novolac vinyl ester resin out of the range of the component (A) of the invention as a starting material, there is a tendency that a cured product having required mechanical properties and heat resistance is difficult to obtain.

Further, by concurrently using unsaturated monobasic acid and excessive monocarboxylic acid and causing unsaturated monobasic acid and excessive monocarboxylic acid to act on the novolac epoxy resin, introduction of a necessary ethylenically unsaturated group and modification of a hydroxyl group may be performed together. That is, introduction of a necessary ethylenically unsaturated group is performed by unsaturated monobasic acid and the remaining epoxy group is ring-opened by monocarboxylic acid to generate a hydroxyl group. Further, this is a method of adjusting the content of the hydroxyl group by reaction with the hydroxyl group by excessive monocarboxylic acid. In this case, the reaction of the unsaturated monobasic acid, the monocarboxylic acid, and the hydroxyl group and the reaction of the unsaturated monobasic acid, the monocarboxylic acid, and the epoxy group are competition reaction, and thus it is necessary to carefully control the reaction ratio to a desired reaction ratio and to pay attention to quality management. For this reason, it is preferable to precisely control reactivity of the unsaturated monobasic acid and the monocarboxylic acid. Further, from the viewpoint that such precise control is not necessary, the after-described Scheme 2 is preferable.

Incidentally, all of the epoxy group, which may typically remain in a state of being not reacted is ring-opened, and short chain and long chain units are introduced. Thus, since the viscosity of a composition blended with the component (B): an ethylenically unsaturated monomer described later tends to increase, it is necessary to pay attention to the viscosity at the time of blending the component (B).

As a more specific method of implementation of (Scheme 2), a method of modifying the hydroxyl group of the component (A') at the subsequent step is exemplified.

The hydroxyl value of the component (A') is preferably more than 150 mgKOH/g and more preferably 340 mgKOH/g or less.

The component (A') is obtained by reacting the unsaturated monobasic acid with the novolac epoxy resin, but in a case where the hydroxyl value exceeds 340 mgKOH/g, as clearly known from the production process of the component (A'), since the ethylenically unsaturated group is also introduced together with generation of the hydroxyl group, the ethylenically unsaturated group density increases. For this reason, when a novolac epoxy resin having a hydroxyl value of 340 mgKOH/g or less is used as a starting material, it is possible to control that a cured product becomes hard and brittle. In addition, when a novolac epoxy resin having a hydroxyl value of more than 150 mgKOH/g is used as a starting material, the ethylenically unsaturated group density can be set to properly high. Thus, a cured product having favorable mechanical properties and heat resistance can be obtained from the thermosetting resin composition and the SMC obtained by using such a novolac epoxy resin as a starting material.

As a product containing the component (A'), "NEOPOL 8411" (trade name, manufactured by Japan U-Pica Company Ltd.) in which an ethylenically unsaturated monomer such as styrene is blended in the novolac vinyl ester resin is exemplified.

As a method of modifying the component (A'), for example, introduction of a protective group in protection/deprotection reaction of a hydroxyl group which is conventionally widely known in the organic synthesis field is exemplified. Particularly, as a non-catalyzed synthesis method, the following method is exemplified.

(Scheme 2-1): a method of reacting monocarboxylic acid with the hydroxyl group (Scheme 2-2): a method of reacting a component (E): monoisocyanate with the hydroxyl group The method of reacting monocarboxylic acid or monoisocyanate with respect to the hydroxyl group of (Scheme 2-1) and (Scheme 2-2) can be said to be an excellent method from the following reason. That is, a catalyst is not necessary. In addition, a by-product is not generated or only a by-product such as water which can be simply removed is generated.

In (Scheme 2-1), similarly to (Scheme 1), reaction with the hydroxyl group by causing monocarboxylic acid to act on the component (A') under heating and reaction with the remaining epoxy group occur. For this reason, reaction of the monocarboxylic acid, the hydroxyl group, and the epoxy group, generation of the hydroxyl group according to ring-opening of the epoxy group and reaction between the hydroxyl group and monocarboxylic acid occur. Although reaction is one-pot reaction, since multistage reaction occurs in the system, precise reaction control including the entire system is needed. In addition, since a part or the whole of the epoxy group which may remain in a state of being not reacted is ring-opened, similarly to (Scheme 1), it is necessary to pay attention that the viscosity is not higher than a desired viscosity at the time of blending the component (B).

In (Scheme 2-2), since reaction is advanced selectively with respect to the hydroxyl group, and further a by-product is not generated, this scheme is more suitable as a method of adjusting the contents of the hydroxyl group and the ethylenically unsaturated group. In addition, this scheme can be suitably used also in a system containing the component (A') and the component (B). Further, this scheme is also excellent in terms that the reaction with monoisocyanate does not need a special facility such as a heating facility. According to this (Scheme 2-2), the component (A) which is a novolac vinyl ester resin having a hydroxyl group and an ethylenically unsaturated group in the molecule and having one or more urethane bonds is obtained.

The ratio of the mole number of the isocyanate group of the component (E) to the mole number of the hydroxyl group of the component (A') is more preferably 15 mol % or more and 80 mol % or less and further preferably 20 mol % or more. That is, it is more preferable to react an amount of 15 to 80 mol % of the isocyanate group of the component (E) with respect to the total of the hydroxyl group of the component (A'). When the ratio is 15 mol % or more, the hydroxyl group of the component (A) to be obtained becomes suitably smaller, and thickening stability becomes more favorable. Meanwhile, in a case where the ratio is 80 mol % or less, since the hydroxyl group properly remains, the time for aging the SMC formed from the component (A) to be obtained can be shortened.

As monocarboxylic acid used in (Scheme 2-1), a conventionally known monocarboxylic acid can be used, but monocarboxylic acid of an alkyl group in which the boiling point is in a range of 100° C. or higher and 200° C. or lower and the number of carbons is in a range of 1 or more and 20 or less is more preferable.

Regarding the boiling point and the number of carbons of the alkyl group, in the above ranges, as the boiling point becomes higher or the number of carbons becomes larger, the outflow of monocarboxylic acid when water generated with progress of the reaction at the time of synthesis is removed can be suppressed, and thus the reaction control is easily performed. Incidentally, in a case where long-chain monocarboxylic acid is largely introduced in accordance with ring-opening of the epoxy group, when the novolac vinyl ester resin obtained in this way is blended with the component (B), the viscosity is likely to become higher, and thus it is necessary to pay attention to the viscosity.

Regarding the boiling point and the number of carbons of the alkyl group, in the above ranges, as the boiling point becomes lower or the number of carbons becomes smaller, a unit to be introduced in accordance with ring-opening of the epoxy group becomes smaller, and thus an excessive increase in viscosity of a composition obtained by blending a resin obtained by action of such monocarboxylic acid with the component (B) can be suppressed, which is superior.

As described above, the monocarboxylic acid used in (Scheme 2-1) may be appropriately selected from the viewpoint of reaction control at the time of production and quality management and from the viewpoint of characteristics of a thermosetting resin composition to be obtained.

[Component (E)]

As monoisocyanate that is the component (E), monoisocyanate having at least one ethylenically unsaturated group in the molecule and monoisocyanate not having an ethylenically unsaturated group in the molecule can be broadly divided.

Examples of the monoisocyanate not having an ethylenically unsaturated group in the molecule include aliphatic monoisocyanates, aromatic monoisocyanates, halogenated monoisocyanates, alicyclic monoisocyanates, S-containing monoisocyanates, and Si-containing monoisocyanates. The aliphatic monoisocyanates are typified, for example, by methyl isocyanate, butyl isocyanate, and the like. The aromatic monoisocyanates are typified, for example, by phenyl isocyanate, benzyl isocyanate, biphenyl isocyanate, 1-naphthyl isocyanate, and the like. The halogenated monoisocyanates are typified, for example, by 2-chlorophenyl isocyanate, 2-bromophenyl isocyanate, 3,5-bis(trifluoromethyl)phenyl isocyanate, trichloromethyl isocyanate, and the like. The alicyclic monoisocyanates are typified, for example, by cyclohexyl isocyanate, cyclopentyl isocyanate, and the like. The S-containing monoisocyanates are typified, for example, by chlorosulfonyl isocyanate, p-toluenesulfonyl isocyanate, and the like. The Si-containing monoisocyanates are typified, for example, by trimethylsilyl isocyanate and the like.

By using monoisocyanate having at least one ethylenically unsaturated group in the molecule as the component (E), a novolac vinyl ester resin having an ethylenically unsaturated group is obtained as the component (A). The component (A) has a novolac skeleton into which an ethylenically unsaturated group derived from the component (E) is introduced via the urethane bond. Incidentally, in this case, the ethylenically unsaturated group is not bonded directly to the urethane bond, but is bonded to the urethane bond via a partial structure derived from the component (E). Such a novolac vinyl ester resin suppresses the amount of the hydroxyl group to an appropriate range and has more ethylenically unsaturated groups so as to have both a high thickening stability and a high curability, which is preferable. That is, as the component (E), unsaturated isocyanate having one isocyanate group and at least one ethylenically unsaturated group in the same molecule is preferable.

Examples of commercially available products of the monoisocyanate having at least one ethylenically unsaturated group in the molecule include methacryloyloxyethyl isocyanate (trade name: Karenz MOI, manufactured by Showa Denko K.K.) and acryloyloxyethyl isocyanate (trade name: Karenz AOI, manufactured by Showa Denko K.K.).

Further, the monoisocyanate having an ethylenically unsaturated group in the molecule can be synthesized by reacting diisocyanate with unsaturated monoalcohol or unsaturated monoamine having a hydroxyl group and an ethylenically unsaturated group.

As the unsaturated monoalcohol, conventionally known compounds can be used. Examples of those having one ethylenically unsaturated group in the molecule include hydroxyl (meth)acrylate monomers and unsaturated monoalcohols. Examples of the hydroxyl (meth)acrylate monomers include 4-hydroxybutyl acrylate and 1,4-cyclohexanedimethanol monoacrylate. Examples of the unsaturated monoalcohols include allyl alcohol, vinyl alcohol, oleyl alcohol, and erucyl alcohol. Examples of those having two ethylenically unsaturated groups in the molecule include unsaturated alcohols having two ethylenically unsaturated groups in the molecule, and examples of such unsaturated alcohols include trans-2-dodecenal, 2,4-dodecadiene-1-ol, linoleyl alcohol, and elaidyl alcohol. Further, examples of unsaturated amine having one ethylenically unsaturated group in the molecule include allylamine.

As diisocyanate which can suitably react unsaturated monoalcohol or unsaturated monoamine, bifunctional diisocyanate described in the description of the component (D): polyisocyanate described below is suitably used.

In a case where the monoisocyanate having at least one ethylenically unsaturated group in the molecule is obtained by reaction between the unsaturated monoamine or the unsaturated monoalcohol and diisocyanate, a by-product may also be generated. For this reason, separation, purification, and the like may be needed as necessary. In this regard, in consideration of all the molecular frame, the number of functional groups, and sequential reaction, it is necessary to select diisocyanate to be used.

Of existing monoisocyanate and monoisocyanate obtained by the above-described method, methacryloyloxyethyl isocyanate and acryloyloxyethyl isocyanate having an unsaturated bond group and one isocyanate group are suitably used. These isocyanates are preferable from the viewpoint that purification is not necessary, the viewpoint that reaction can be advanced along stoichiometry, the viewpoint of easy handleability, and the viewpoint of favorably introducing an ethylenically unsaturated group. In addition, these diisocyanates may be used singly or in combination of two or more kinds thereof.

[Component (B)]

The component (B) is an ethylenically unsaturated monomer and used as a solvent of a component of other thermosetting resin composition. Specific examples of the component (B) include, although not particularly limited, the following compounds.

Examples thereof include (meth)acrylates, hydroxyalkyl (meth)acrylates, hydroxyl group-containing vinyl monomers, styrene-based monomers, (meth)acrylamide compounds, unsaturated carboxylic acids, polymerizable unsaturated nitriles, unsaturated carboxylic acid esters, vinylesters, and vinylesters. In addition, examples of the (meth)acrylates include methyl (meth)acrylate, ethyl(meth)acrylate, propyl (meth)acrylate, n-butyl (meth)acrylate, t-butyl (meth)acrylate, isobutyl (meth)acrylate, 2-ethylhexyl(meth)acrylate, n-nonyl (meth)acrylate, cyclohexyl (meth)acrylate, benzyl (meth)acrylate, dicyclopentanyl (meth)acrylate, dicyclopentenyl (meth)acrylate, 2-dicyclopentenoxy ethyl(meth)acrylate, isobornyl (meth)acrylate, methoxyethyl (meth)acrylate, ethoxyethyl (meth)acrylate, butoxyethyl (meth)acrylate, methoxy ethoxyethyl (meth)acrylate, ethoxy ethoxyethyl (meth)acrylate, and tetrahydrofurfuryl (meth)acrylate. Examples of the hydroxyalkyl (meth)acrylates include 2-hydroxyethyl (meth)acrylate, 2-hydroxypropyl (meth)acrylate, 3-hydroxypropyl (meth)acrylate, and 4-hydroxybutyl (meth)acrylate. Examples of the hydroxyl group-containing vinyl monomers include an adduct of 2-hydroxyethyl (meth)acrylate and ethylene oxide, an adduct of 2-hydroxyethyl (meth)acrylate and propylene oxide, and an adduct of 2-hydroxyethyl (meth)acrylate and organic lactones (such as s-caprolactone). Examples of the styrene-based monomers include styrene and styrene derivatives (such as α-methylstyrene, p-t-butyl styrene, and vinyl toluene). Examples of the (meth)acrylamide compounds include N,N-dimethyl (meth)acrylamide, and N,N-diethyl (meth)acrylamide. Examples of the unsaturated carboxylic acids include (meth)acrylic acid, itaconic acid, maleic acid, and fumaric acid. Examples of the polymerizable unsaturated nitriles include (meth)acrylonitrile. Examples of the unsaturated carboxylic acid esters include diethyl maleate, dibutyl maleate, dibutyl fumarate, diethyl itaconate, and dibutyl itaconate. Examples of the vinylesters include vinyl acetate and vinyl propionate. These ethylenically unsaturated monomers may be used singly or in combination of two or more kinds thereof. In a case where reducing of odor is required in an SMC to be finally obtained, those having a high vapor pressure or a high boiling point may be selected. Further, the ethylenically unsaturated monomer may be appropriately selected in consideration of reactivity at the time of polymerization.

[Component (D)]

The polyisocyanate compound which is the component D is used as a thickener. Examples of the component (D) include bifunctional diisocyanate and tri- or higher functional polyisocyanate which are conventionally known.

Specific examples of the component (D) include bifunctional diisocyanate such as 2,4-toluene diisocyanate, 2,6-toluene diisocyanate, 4,4'-diphenylmethane diisocyanate (MDI), isophorone diisocyanate (IPDI), hexamethylene diisocyanate (HDI), tolylene diisocyanate, xylene diisocyanate, or tetramethylxylylene diisocyanate, and other tri- or higher functional polyisocyanate.

Further, other than the above-described specific examples, an isocyanate prepolymer, which is obtained by reaction between a polyether polyol or polyester polyol having a hydroxyl group and diisocyanate and had an isocyanate group at the terminal, or the like may be used.

Further, as polyisocyanate, a modified product of an isocyanate compound may be used. Specifically, carbodiimide-modified liquid MDI (having MDI, MDI carbodiimide, or MDI carbodiimide adduct as a main component) may be used.

The specific examples of the component (D) exemplified above may be used singly or in combination of two or more kinds thereof. By changing the type and ratio of polyisocyanate, it is possible to suppress reaction immediately after mixing and adjust acceleration or the like. The type and ratio of polyisocyanate may be appropriately changed according to steps to be applied.

[Component (F)]

The thermosetting resin composition according to the invention may contain a component (F): a bisphenol type vinyl ester resin or a modified bisphenol type vinyl ester resin. By containing the component (F), a thermosetting resin which is excellent in thickening stability while having favorable handleability and solubility can be obtained.

The component (F) can be obtained, for example, by reacting a bisphenol type epoxy resin with an unsaturated monobasic acid.

Examples of the bisphenol type epoxy resin include epoxy resins of bisphenol A type, bisphenol F type, bisphenol S type, and the like, and examples of the modified bisphenol type epoxy resin include halogenated, hydrogenated, ethylene oxide-added, and propylene oxide-added epoxy resins. Examples of the halogenated epoxy resin include brominated products of the bisphenol type epoxy resins described above. In addition, other constituent units may be appropriately introduced into the side chain via the urethane bond. These bisphenol type epoxy resins and modified bisphenol type epoxy resins may be used singly or in combination of two or more kinds thereof.

Examples of products in which an ethylenically unsaturated monomer such as styrene is blended in the bisphenol type vinyl ester resin include "NEOPOL 8051" and "NEOPOL 8101" (trade name, all manufactured by Japan U-Pica Company Ltd.).

[Component (G)]

The polymerization initiator which is the component (G) is not particularly limited, and organic peroxides such as peroxydicarbonates, peroxyesters, peroxymonocarbonates, peroxyketals, and dialkyl peroxides can be used.

For example, organic peroxides such as t-amyl peroxy propyl carbonate (trade name: AIC75, manufactured by Kayaku Akzo Corporation), t-butylperoxy isopropyl carbonate (trade name: BIC-75, manufactured by Kayaku Akzo Corporation), 1,1-di(t-hexylperoxy)cyclohexane (trade name: PERHEXA HC), 1,1-di(t-butylperoxy)cyclohexane (trade name: PERHEXA C-80 (S), PERHEXA C-75 (EB), and the like), methyl ethyl ketone peroxide, t-butylperoxy benzoate, benzoyl peroxide, dicumyl peroxide, and cumene hydroperoxide are exemplified.

Of them, in a case where the residual amount of the ethylenically functional group is desired to decrease, it is preferable to use t-amyl peroxy propyl carbonate having an amyl group in the molecule. In addition, from the viewpoint of stability to various auxiliary agents and stability over time, the number of acyl groups in the molecule is preferably small. As the number of acyl groups in the molecule becomes smaller, stability tends to be excellent.

The polymerization initiator exemplified above can be appropriately changed according to polymerization initiation temperature and required curing time, and may be used singly or in combination of two or more kinds thereof. In addition, combined usage of an initiator having a different 10 hours half-life temperature is useful for shortening the curing time at the time of polymerization.

[Method for Producing Thermosetting Resin Composition]

Examples of the method for producing a thermosetting resin composition include the following Methods 1 to 4.

Method 1: The component (A) is obtained by synthesis and then is dissolved in the component (B) to obtain a mixture of the component (A) and the component (B). Subsequently, a thermosetting resin can be obtained by blending various additives as necessary and mixing the component (D).

Method 2: The component (A') reacts with monocarboxylic acid and then the obtained product is dissolved in the component (B) to obtain a mixture of the component (A) and the component (B). Subsequently, a thermosetting resin can be obtained by blending various additives as necessary and mixing the component (D).

Method 3: The component (A') reacts with the component (E) and then the obtained product is dissolved in the component (B) to obtain a mixture of the component (A) and the component (B). Subsequently, a thermosetting resin can be obtained by blending various additives as necessary and mixing the component (D). When this method is performed, it is necessary to pay attention to selection of materials of the component (A') and the component (E).

Method 4: The component (A') is dissolved in the component (B) to obtain a mixture of the component (A') and the component (B). Subsequently, a mixture of the component (A) and the component (B) is obtained by reaction with addition of the component (E). Subsequently, a thermosetting resin can be obtained by blending various additives as necessary and mixing the component (D). Since the reaction is advanced in any stage at a very mild condition, this method has low dependency on a production facility and can simply obtain the thermosetting resin and the thermosetting resin composition of the invention, which is more preferable.

The blending example at the time of obtaining the thermosetting resin composition will be described below as an example.

The content of the component (A) is preferably 40 weight % or more, more preferably 50 weight % or more, and preferably 90 weight % or less, more preferably 80 weight % or less, with respect to 100 parts by weight of the total weight of the component (A) and the component (B). When the content of the component (A) is set to 40 weight % or more, the amount of VOC in the molded article of the SMC can be decreased. In addition, when the content of the component (A) is set to 90 weight % or less, the viscosity can be properly decreased, and thus impregnation in the component (C): a reinforced fiber bundle having a fiber length of 5 mm or more and 120 mm or less becomes easier. Therefore, generation of non-impregnated part of the thermosetting resin composition is suppressed, and an SMC having high quality without defects can be obtained.

Further, the same applies in the case of containing the component (F), and the total weight of the component (A) and the component (F) is preferably 40 weight % or more, more preferably 50 weight % or more, and preferably 90 weight % or less, more preferably 80 weight % or less, with respect to 100 parts by weight of the total weight of the component (A), the component (F), and the component (B).

The amount of the component (F) blended is preferably 20 parts by weight or more and 80 parts by weight or less when the total weight of the component (A) and the component (F) is regarded as 100 parts by weight. As one of effects obtained by containing the component (F), the effect of improvement in thickening stability of the thermosetting resin composition is exemplified. When the amount of the component (F) blended is set to 20 parts by weight or more, the effect of improvement in thickening stability becomes more significant, and hardness and brittleness are reduced so that a fiber-reinforced composite material having excellent mechanical properties can be obtained. Further, as the amount of the component (F) increases, thickening stability tend to be improved. When the amount of the component (F) blended is set to 80 parts by weight or less, a decrease in heat resistance of a fiber-reinforced composite material to be obtained can be prevented and an SMC produced by using such a thermosetting resin composition can terminate thickening within an appropriate time, which is also preferable in terms of productivity.

The amount of the component (D) blended is preferably such an amount that the ratio of the mole number of the isocyanate group of the component (D) to the mole number of the hydroxyl group of the component (A) is 0.1 or more and 10 or less. In addition, the same applies in the case of containing the component (F), and the amount of the component (D) blended is preferably such an amount that the ratio of the mole number of the isocyanate group of the component (D) to the total mole number of the hydroxyl group of the component (A) and the component (F) is 0.1 or more and 10 or less. When the ratio is set to 0.1 or more, thickening can be performed to a level at which handleability at the time of usage required for SMC. Meanwhile, in the reaction between the hydroxyl group and the polyisocyanate, in a case where the polyisocyanate excessively exists, it is known that the polyisocyanate reacts with a urethane bond part, which has been formed in advance, to obtain a polyfunctional structure. In addition, in a case where the polyfunctional structure is excessively generated, fluidity may be inferior at the time of obtaining an SMC. Therefore, in order to suppress the generation of the polyfunctional structure, the ratio is set to preferably 10 or less.

The amount of the component (D) blended varies largely depending on the type of the component (A), the component (F), and the component (D) to be used. The amount of the component (D) blended may be appropriately set from the viewpoint of thickening behavior immediately after blending the thermosetting resin composition, the final viscosity at the time of thickening completion, whether the SMC and a molded article thereof is an interior member or an external member, whether or not environmental compatibility is necessary, and the like.

The amount of the component (G) blended is preferably 0.1 part by weight or more, more preferably 0.5 part by weight or more, and preferably 5 parts by weight or less, more preferably 3 parts by weight or less, with respect to 100 parts by weight of the component (A). In addition, the same applies in the case of containing the component (F), the amount of the component (G) blended is preferably 0.1 part by weight or more, more preferably 0.5 part by weight or more, and preferably 5 parts by weight or less, more preferably 3 parts by weight or less, with respect to 100 parts by weight of the total weight of the component (A) and the component (F).

The thermosetting resin composition according to the invention may contain components other than the aforementioned components. For example, a curing promoter, an inorganic filler, an internal mold release agent, a stabilizing agent (polymerization inhibitor), a pigment, a colorant, a wetting and dispersing agent, a water absorbing agent, an ultraviolet absorbing agent, a photostabilizing agent, an antioxidant, and the like are exemplified. In addition, an unsaturated polyester generally and often used in the SMC may be concurrently used as the thermosetting resin within a range not impairing the effect of the invention.

Specific examples of the curing promoter include, although not particularly limited, metallic soaps, metallic complexes, and amines. The metallic soaps are typified, for example, by cobalt naphthenate, cobalt octenoate, zinc octylate, vanadyl octenoate, copper naphthenate, barium naphthenate, and the like. The metallic complexes are typified, for example, by vanadyl acetylacetate, cobalt acetylacetate, iron acetylacetonate, and the like. The amines are typified, for example, by aniline, N,N-dimethylamino-p-benzaldehyde, N,N-dimethylaniline, N,N-diethylaniline, N,N-dimethyl-p-toluidine, N-ethyl-m-toluidine, triethanolamine, m-toluidine, diethylene triamine, pyridine, phenylmorpholine, piperidine, diethanolaniline, and the like. Particularly, an amine-based promoter is preferable. These curing promoters may be used singly or in combination of two or more kinds thereof.

The amount of the curing promoter added is preferably 0.001 part by weight or more and 5 parts by weight or less with respect to 100 parts by weight of the total weight of the component (A) and the component (B), and in the case of containing the component (F), with respect to 100 parts by weight of the total weight of the component (A), the component (B), and the component (F).

Specific examples of the inorganic filler include, although not particularly limited, carbon fiber powder, milled carbon fibers, milled fibers, calcium carbonate, magnesium carbonate, aluminum hydroxide, magnesium hydroxide, calcium hydroxide, silica, fused silica, barium sulfate, titanium oxide, magnesium oxide, calcium oxide, aluminum oxide, calcium phosphate, talc, mica, clay, and glass powder. These inorganic fillers may be used singly or in combination of two or more kinds thereof. Of them, carbon fiber powder and milled carbon fibers having a small density and high reinforcement effect are suitably used.

The amount of the inorganic filler added is preferably set to be requisite minimum from the viewpoint of weight saving, and for example, is preferably 1 part by weight or more and 200 parts by weight or less with respect to 100 parts by weight of the total weight of the component (A) and the component (B), and in the case of containing the component (F), with respect to 100 parts by weight of the total weight of the component (A), the component (B), and the component (F).

By the effect obtained by addition of the inorganic filler, there is a tendency that the heat resistance of the thermosetting resin composition itself is improved, and stickiness (tackiness) of the thermosetting resin composition after aging is reduced to improve handleability. Therefore, the content of the inorganic filler can be determined in consideration of density, handleability, and fluidity of an SMC to be obtained and heat resistance of a molded article obtained by molding the SMC. Among inorganic fillers, for example, in the case of using carbon fiber powder and milled carbon fibers, the content of the inorganic filler is preferably 1 part by weight or more and 50 parts by weight or less with respect to 100 parts by weight of the total weight of the component (A) and the component (B), and in the case of containing the component (F), with respect to 100 parts by weight of the total weight of the component (A), the component (B), and the component (F). When the content of the inorganic filler is set to 1 part by weight or more, a sufficient effect obtained by the inorganic filler is obtained, and when the content of the inorganic filler is set to 50 parts by weight or less, fluidity can be maintained to be favorable at the time of forming an SMC.

Specific examples of the internal mold release agent include, although not particularly limited, a fatty acid metal salt and a surfactant. Examples of the fatty acid metal salt include calcium stearate and zinc stearate. Examples of the surfactant include sodium dialkyl sulfosuccinate. These internal mold release agents may be used singly or in combination of two or more kinds thereof.

The amount of the internal mold release agent added varies largely depending on the required level of releasing property and an additive material, and for example, is preferably 0.1 part by weight or more and 10 parts by weight or less with respect to 100 parts by weight of the total weight of the component (A) and the component (B), and in the case of containing the component (F), with respect to 100 parts by weight of the total weight of the component (A), the component (B), and the component (F).

Specific examples of the ultraviolet absorbing agent include, although not particularly limited, various additives typified by a benzotriazole-based ultraviolet absorbing agent and a triazine-based ultraviolet absorbing agent. Examples thereof include Tinuvin PS, Tinuvin 479, and Tinuvin 571 (trade name, all manufactured by BASF). These ultraviolet absorbing agents may be used singly or in combination of two or more kinds thereof.

The amount of the ultraviolet absorbing agent added is preferably 1 part by weight or more and 10 parts by weight or less with respect to 100 parts by weight of the total weight of the component (A) and the component (B), and in the case of containing the component (F), with respect to 100 parts by weight of the total weight of the component (A), the component (B), and the component (F).

Further, a conventionally known vinyl ester resin is generally known to have a wide light absorption band in an ultraviolet light range and a visible light range and to absorb a part of visible light. Therefore, when an ultraviolet absorbing agent is selected, it is preferable to select an ultraviolet absorbing agent having a high absorbance and a wide absorption band and more preferable to use a material having an absorption band reaching a visible light range.

A specific examples of the photostabilizing agent is not particularly limited, but for example, various additives typified by a hindered phenol-based photostabilizing agent are suitably used. Examples thereof include Tinuvin 123, Tinuvin 5100, and Tinuvin 765 (trade name, all manufactured by BASF). These photostabilizing agents may be used singly or in combination of two or more kinds thereof.

The amount of the photostabilizing agent added is preferably 1 part by weight or more and 5 parts by weight or less with respect to 100 parts by weight of the total weight of the component (A) and the component (B), and in the case of containing the component (F), with respect to 100 parts by weight of the total weight of the component (A), the component (B), and the component (F). It is necessary to pay attention to the amount such that the amount of the photostabilizing agent added is not excessive so that polymerization curing is not inhibited.

Further, when the ultraviolet absorbing agent and the photostabilizing agent are concurrently used, the effect is further enhanced as compared to the case of using the ultraviolet absorbing agent and the photostabilizing agent singly.

A specific example of the antioxidant is not particularly limited, but for example, various additives typified by a hindered phenol-based antioxidant are suitably used. Examples thereof include Irganox 1010, Irganox 1726, Irganox 1035, Irganox 1076, and Irganox 1135 (trade name, all manufactured by BASF). These antioxidants may be used singly or in combination of two or more kinds thereof.

The amount of the antioxidant added is preferably 1 parts by weight or more and 10 parts by weight or less with respect to 100 parts by weight of the total weight of the component (A) and the component (B), and in the case of containing the component (F), with respect to 100 parts by weight of the total weight of the component (A), the component (B), and the component (F). Since the antioxidant has high radical sensitivity, the antioxidant may further inhibit polymerization curing as compared to the photostabilizing agent. For this reason, it is preferable to keep the amount to the optimal added amount.

[SMC]

The SMC according to an embodiment of the invention contains a thickened product of the aforementioned thermosetting resin composition of the invention and a component (C): a reinforced fiber bundle having a fiber length of 5 mm or more and 120 mm or less.

[Component (C)]

The component (C) is a reinforced fiber bundle having a fiber length of 5 mm or more and 120 mm or less. The component (C) may be obtained by cutting a reinforced fiber bundle formed from continuous reinforced fibers into a desired fiber length.

The type of the reinforced fibers constituting the component (C) is not particularly limited, and for example, inorganic fibers, organic fibers, metallic fibers, reinforced fibers having a hybrid configuration obtained by combining those fibers are exemplified.

Examples of the inorganic fibers include carbon fibers (including graphite fibers, the same applies hereinafter), silicon carbide fibers, alumina fibers, tungsten carbide fibers, boron fibers, and glass fibers. Examples of the organic fibers include aramid fibers, high-density polyethylene fibers, other general nylon fibers, and polyester fibers. Examples of the metallic fibers include fibers of stainless steel, iron, and the like, and carbon fibers coated with a metal may also be used. Among these inorganic fibers, carbon fibers are preferable in consideration of mechanical properties such as strength of a molded article.

Examples of the carbon fibers include polyacrylonitrile (PAN)-based carbon fibers, rayon-based carbon fibers, and pitch-based carbon fibers. Among them, PAN-based carbon fibers are preferable from the viewpoint of having excellent compression strength and a low density. These carbon fibers may be used singly or in combination of two or more kinds thereof.

The number of filaments of the component (C) is preferably 1,000 or more, more preferably 2,000 or more, and preferably 30,000 or less, more preferably 20,000 or less. When the number of filaments is 1,000 or more, entanglement of fibers at the time of producing the SMC is suppressed and the fluidity of the SMC is improved. In addition, when the number of filaments is 30,000 or less, since the size of each bundle is sufficiently small, a variation in mechanical properties of the SMC can be decreased.

The number of filaments of the reinforced fiber bundle formed from continuous fibers used in the production of the component (C) is not necessarily coincident with the number of filaments of the component (C), and for example, a reinforced fiber bundle having the number of filaments in a range of 1,000 or more and 100,000 or less can be suitably used. In addition, in order to obtain the component (C), a fiber bundle can be used, for example, by being divided in-line or off-line in each cases.

Further, in a case where entanglement of the reinforced fiber bundle is large, a method of alleviating entanglement of reinforced fibers by mixing (reinforced) fibers capable of being dissolving in the component (B) is mentioned as an example and is useful.

A ratio of mixing (reinforced) fibers capable of being dissolving in the component (B) is considered to be suitably in a range of 1% or more and 50% or less with respect to the total number of reinforced fiber bundles. When the ratio is 1% or more, entanglement of the reinforced fiber bundle is alleviated. When the ratio is 50% or less, the reinforcement effect of the reinforced fibers is suitably obtained. The ratio may be appropriately set from mechanical properties and fluidity, and further from a request value with respect to a variation between mechanical properties and fluidity.

The fiber length of the component (C) is 5 mm or more and 120 mm or less, more preferably 10 mm or more, further preferably 20 mm or more, and more preferably 80 mm or less, further preferably 60 mm or less. In a case where the fiber length is less than 5 mm, fluidity at the time of molding an SMC is excellent, but mechanical properties of a molded article to be obtained tends to be inferior. In a case where the fiber length exceeds 120 mm, mechanical properties of a molded article to be obtained are excellent, but fluidity at the time of molding an SMC tends to be inferior. When the fiber length is 5 mm or more and 120 mm or less, a balance between mechanical properties of a molded article and fluidity at the time of molding an SMC can be achieved.

The component (C) is preferably 20 parts by weight or more, more preferably 30 parts by weight or more, and preferably 80 parts by weight or less, more preferably 70 parts by weight or less, with respect to 100 parts by weight of the thermosetting resin composition. When the component (C) is 20 parts by weight or more, mechanical characteristics of a molded article of an SMC to be obtained becomes favorable, and when the component (C) is 80 parts by weight or less, fluidity at the time of molding an SMC to be obtained becomes favorable.

The basis weight of the component (C) contained in the SMC is preferably 50 g/sm or more, more preferably 500 g/sm or more, further preferably 1,000 g/sm or more, and preferably 4,000 g/sm or less, more preferably 3,000 g/sm or less. When the basis weight is in the above ranges, a molded article which is more uniform and has favorable physical properties can be obtained. Particularly, a molded article obtained from the SMC containing the component (C) having a basis weight of 1,000 g/sm or more has a higher elastic modulus, which is preferable.

[Thickened Product of Thermosetting Resin Composition]

The SMC according to the invention includes a thickened product of the thermosetting resin composition according to the invention. The thickened product of the thermosetting resin composition is obtained by reacting the hydroxyl group of the component (A) and other arbitrary components with the isocyanate group of the component (D) by keeping the thermosetting resin composition at almost constant temperature for a certain time (hereinafter, referred to as "aging" or "aging step" in some cases).

The condition of the aging step varies depending on components contained in the thermosetting resin composition, but the condition at a temperature of typically 10° C. or higher and 50° C. or lower and for a period of time of typically 0.5 days or longer and 30 days or shorter is exemplified. By aging and thickening the thermosetting resin composition under the condition, a thickened product of the thermosetting resin composition is obtained.

The viscosity of the thickened product of the thermosetting resin composition at 25° C. is preferably 5,000 Pa·s or more, more preferably 8,000 Pa·s or more, and preferably 100,000 Pa·s or less, more preferably 80,000 Pa·s or less. However, the viscosity of the thickened product is merely an index of handleability. Even when the viscosity is out of the aforementioned preferable ranges, there is no stickiness at the time of using the thickened product as the SMC, and in the case of having excellent fluidity, the thickened product can be used as the SMC. Particularly, as the thermosetting resin composition is thickened uniformly, there is a tendency that stickiness less occurs even in a low viscosity region and handleability is excellent at the time of using the thickened product as the SMC.

Incidentally, the viscosity in an embodiment of the invention means a value measured by a viscometer such as a digital viscometer BB DV-I Prime equipped with a T bar manufactured by Brookfield Engineering.

[Method for Producing SMC]

The method for producing an SMC according to an embodiment of the invention includes a step of obtaining a thermosetting resin composition according to the embodiment of the invention, a step of impregnating the obtained thermosetting resin composition in the component (C) to obtain an SMC precursor, and a step of thickening the thermosetting resin composition contained in the SMC precursor.

As the step of obtaining a thermosetting resin composition according to an embodiment of the invention, for example, Method 4 of the aforementioned Methods 1 to 4 is preferable. As a production process of the SMC using Method 4, more specifically, the following process is exemplified. Incidentally, as described above, in many cases, the component (A') is sold as a product obtained by dissolving the component (A') in an ethylenically unsaturated monomer such as styrene, and the following process is preferable since such a product can be applied without any change.

(Process)

The process includes a step (i-1) of dissolving a component (A'): a novolac vinyl ester resin having a hydroxyl group and an ethylenically unsaturated group in the molecule and having a hydroxyl value of more than 150 mgKOH/g in a component (B): an ethylenically unsaturated monomer and then mixing a component (E): monoisocyanate to react the resulting mixture, a step (i-2) of obtaining a thermosetting resin composition by mixing a component (D): polyisocyanate with a reaction product obtained in the step (i-1), a step (i-3) of obtaining a sheet-molding compound precursor (hereinafter, referred to as the "SMC precursor") by impregnating the thermosetting resin composition obtained in the step (i-2) in a component (C): a reinforced fiber bundle having a fiber length of 5 mm or more and 120 mm or less, and a step (i-4) of thickening the thermosetting resin composition in the SMC precursor.

(Step (i-1))

By the step (i-1), a component (A) is obtained which is a novolac vinyl ester resin having a hydroxyl group and an ethylenically unsaturated group in the molecule and in which a hydroxyl value of the component (A) is 150 mgKOH/g or less, and the mole number of the hydroxyl group with respect to the mole number of the ethylenically unsaturated group per 1 g, that is, "(the amount of the hydroxyl group [mol/g])/(the amount of the ethylenically unsaturated group [mol/g])" is less than 1.

In the step (i-1), the component (A') reacts with the component (E) to produce a component (A) as a reaction product. The reaction condition is not particularly limited, but for example, the component (A) can be obtained by stirring a reaction liquid containing the component (A'), the component (B), and the component (E) at a temperature of typically about 10° C. or higher and 80° C. or lower for a time of about 0.1 hours or longer and 12 hours or shorter. Incidentally, the aging period from about 0.1 days to 14 days may be provided after heating reaction depending on the reaction condition. Further, in the case of using another component, such as the aforementioned inorganic filler, which may be contained in the thermosetting resin composition, the component may be mixed in the step (i-1) after completion of reaction between the component (A') and the component (E).

(Step (i-2))

In the step (i-2), a thermosetting resin composition is prepared by adding and mixing the component (D) to the reaction product obtained in the step (i-1).

(Step (i-3))

In the step (i-3), a SMC precursor is obtained by impregnating the thermosetting resin composition obtained in the step (i-2) in the component (C).

Specifically, for example, the step (i-3) is performed as follows. First, the thermosetting resin composition is coated on a carrier film by using a doctor blade or the like to form a thermosetting resin composition layer. The thickness of the thermosetting resin composition layer may be appropriately set according to applications of the SMC to be produced, or the like, but is, for example, 0.1 mm or more and 3 mm or less. Then, a sheet-shaped in which the component (C) is randomly laminated two-dimensionally is formed by scattering the component (C) on the surface of the thermosetting resin composition layer. Then, another carrier film having the thermosetting resin composition layer provided thereon is laminated to face the sheet-shaped product to thereby produce a laminate film. The thermosetting resin composition is impregnated in the sheet-shaped product formed from the component (C) by pressurizing the laminate film to produce an SMC precursor. The thickness of the sheet-shaped product after pressurization is, for example, 0.5 mm or more and 5 mm or less.

(Step (i-4))

In the step (i-4), the obtained SMC precursor is kept at almost constant temperature and the thermosetting resin composition is thickened (aged) to obtain an SMC. The aging condition varies depending on a vinyl ester resin and a thickener contained in the thermosetting resin composition, but as described above, the SMC precursor may be maintained at a temperature of typically about 10° C. or higher and 50° C. or lower. The period of time of aging is, for example, 0.5 days or longer and 30 days or shorter.

[Fiber-Reinforced Composite Material]

The fiber-reinforced composite material according to an embodiment of the invention is a cured product obtained by curing an SMC containing a thickened product of the thermosetting resin composition according to the invention and the component (C).

As the method for producing a fiber-reinforced composite material using an SMC, for example, the following method is exemplified.

One sheet of SMC or a product obtained by superimposing a plurality of sheets of SMC are set between a pair of molds. The SMC is heated and compressed to cure a thickened product of the thermosetting resin composition, thereby obtaining a fiber-reinforced composite material as a molded article. The temperature of heating and compressing is, for example, 100° C. or higher and 180° C. or lower. The time for heating and compressing may be appropriately changed according to the thickness of the fiber-reinforced composite material, and is, for example, 0.5 minutes or longer and 60 minutes or shorter and preferably 2 minutes or longer.

Incidentally, the fiber-reinforced composite material may be molded by combining the SMC according to the embodiment of the invention, a known prepreg, and a material, such as non-woven fabric, other than the SMC. By molding the fiber-reinforced composite material using a prepreg laminated body in which a plurality of the SMC according to the invention and a known prepreg are laminated, a molded article or the like provided with convex portions, such as ribs and bosses, that is a fiber-reinforced composite material obtained by molding the SMC according to the invention on a flat plate is obtained.

Further, a molded article having a sandwich structure may be formed by using a honeycomb structure such as a corrugated cardboard as a core material and disposing the SMC on either both surfaces or one surface of the core material.

[Supplementary Information]

As described above, in the thermosetting resin composition according to the invention, it is more preferable that the component (A) has one or more urethane bonds in the molecule.

Further, in the thermosetting resin composition according to the embodiment of the invention, it is more preferable that a hydroxyl value of the component (A) is 30 mgKOH/g or more, and the mole number of the hydroxyl group with respect to the mole number of the ethylenically unsaturated group per 1 g of the component (A), that is, "(the amount of the hydroxyl group [mol/g])/(the amount of the ethylenically unsaturated group [mol/g])" is 0.1 or more and 0.8 or less.

Further, in the thermosetting resin composition according to the embodiment of the invention, it is more preferable that the mole number of the ethylenically unsaturated group per 1 g of the component (A) is 2.5 mmol/g or more and 6.0 mmol/g or less.

Further, in the thermosetting resin composition according to the embodiment of the invention, it is more preferable that the component (A) has a novolac skeleton into which the ethylenically unsaturated group is introduced via the urethane bond.

Further, in the thermosetting resin composition according to the embodiment of the invention, it is more preferable that the component (A) is obtained by reacting a component (E): monoisocyanate with a component (A'): a novolac vinyl ester resin having a hydroxyl group and an ethylenically unsaturated group in the molecule and having a hydroxyl value of more than 150 mgKOH/g.

Further, in the thermosetting resin composition according to the embodiment of the invention, it is more preferable that the component (E) is unsaturated isocyanate having one isocyanate group and at least one ethylenically unsaturated group in the same molecule.

Further, in the thermosetting resin composition according to the embodiment of the invention, it is more preferable that a component (F): a bisphenol type vinyl ester resin or a modified bisphenol type vinyl ester resin is further contained.

Further, in the thermosetting resin composition according to the embodiment of the invention, it is more preferable that a component (G): a polymerization initiator is further contained.

Further, in the thermosetting resin composition according to the embodiment of the invention, it is more preferable that an inorganic filler is further contained.

Further, in the method for producing a sheet-molding compound according to the invention, it is more preferable that in the step (i-1) or the step (i-2), a hydroxyl value of the component (A') is more than 150 mgKOH/g and 340 mgKOH/g or less, and the isocyanate group of the component (E) is reacted in an amount of 15 mol % or more and 80 mol % or less with respect to the total of hydroxyl groups of the component (A').

Further, in the method for producing a sheet-molding compound according to an embodiment of the invention, it is more preferable that in the step (i-1), a component (F): a bisphenol type vinyl ester resin is further mixed.

Further, in the method for producing a sheet-molding compound according to the embodiment of the invention, it is more preferable that the component (E) is an unsaturated isocyanate compound having one isocyanate group and at least one ethylenically unsaturated group in the same molecule.

Further, in the method for producing a sheet-molding compound according to the embodiment of the invention, it is more preferable that in the step (i-1), an inorganic filler is mixed after completion of reaction between the component (A') and the component (E).

The invention is not limited to the various embodiments described above, and various modifications can be made within the scope disclosed in the claims. Embodiments obtainable by appropriately combining the technical means disclosed in different embodiments are also included in the technical scope of the invention.

EXAMPLES

Hereinafter, an embodiment of the invention will be described in detail by Examples; however, the invention is not limited to the following description.

[Raw Material Used]

Raw materials used will be described below.

Mixture of Component (A') and Component (B)

N-VE: manufactured by Japan U-Pica Company Ltd., trade name: NEOPOL 8411, a styrene solution of a novolac vinyl ester resin, the component (A')/the component (B)=68/32 (w/w)

Component (C)

CF-C: a product obtained by cutting a carbon fiber bundle (manufactured by Mitsubishi Rayon Co., Ltd., trade name: TR50S 15L, the number of filaments: 15,000) into a length of 25 mm Component (D) pNCO: manufactured by Mitsui Chemicals, Inc., trade name: COSMONATE LL, polyisocyanate Component (E)

mNCO: manufactured by Showa Denko K.K., trade name: Karenz AOI, monoisocyanate

Component (F)

B-VE: manufactured by Japan U-Pica Company Ltd., trade name: NEOPOL 8051, a styrene solution of a bisphenol A type vinyl ester resin, the component (F)/the component (B)=68/32 (w/w)

Component (G)

INT-A: manufactured by NOF CORPORATION, trade name: PERHEXA C-75 (EB), a 75 weight % solution of 1,1-di(t-butylperoxy)cyclohexane INT-B: manufactured by Kayaku Akzo Corporation, trade name: Kayacarbon BIC-75, a 74 weight % solution of t-butylperoxy isopropyl carbonate Example 1

100 parts by weight of N-VE, 11.5 parts by weight of mNCO, and 0.02 part by weight of 1,4-benzoquinone as a stabilizing agent were sufficiently mixed under the atmosphere at 25° C. and then disappearance of the isocyanate group of mNCO was confirmed to thereby obtain mN-VE1 (a styrene solution of a urethane-modified novolac vinyl ester resin). Incidentally, determination on disappearance of the isocyanate group of mNCO was performed by IR measurement.

The hydroxyl value of non-volatile matter of the obtained mN-VE1 and the functional group ratio of the mole number of the hydroxyl group with respect to the mole number of the ethylenically unsaturated group per 1 g, that is, "(the amount of the hydroxyl group [mol/g])/(the amount of the ethylenically unsaturated group [mol/g])" were as described in Table 1.

Subsequently, 0.5 part by weight of INT-A, 0.5 part by weight of INT-B, 0.35 part by weight of a phosphoric acid ester-based derivative composition (manufactured by Axel Plastics Research Laboratories, Inc., trade name: MOLD WIZ INT-EQ-6) as an internal mold release agent, and 5 parts by weight of milled carbon fibers (manufactured by Nippon Polymer Sangyo Co., Ltd., trade name: MP30X, the content of fibers having a weight average fiber length of 95 μm and 350 μm or less being 99 weight %) were added to the obtained mN-VE1 and the resulting mixture was sufficiently stirred to thereby obtain a resin pre-paste.

A plurality of resin pre-pastes thus obtained were prepared, pNCO was added to each resin pre-paste while the amount of pNCO added was changed, and the resulting mixtures were sufficiently stirred to thereby obtain resin pastes. These resin pastes were aged for 7 days under the atmosphere at 25° C., and then viscosity (aging viscosity), solubility, and handleability were evaluated. Evaluation results are presented in Table 1.

Examples 2 and 3

Resin pastes were obtained by performing the similar operation to Example 1, except that the amount of mNCO added was changed to 19.1 parts by weight or 26.8 parts by weight. These resin pastes were aged for 7 days under the atmosphere at 25° C., and then viscosity (aging viscosity), solubility, and handleability were evaluated. Evaluation results are presented in Table 1.

Example 4

50 parts by weight of N-VE, 7.6 parts by weight of mNCO, and 0.02 part by weight of 1,4-benzoquinone as a stabilizing agent were sufficiently mixed under the atmosphere at 25° C. and then disappearance of the isocyanate group of mNCO was confirmed to thereby obtain mN-VE4 (a styrene solution of a urethane-modified novolac vinyl ester resin). Incidentally, determination on disappearance of the isocyanate group of mNCO was performed by IR measurement.

The hydroxyl value of non-volatile matter of the obtained mN-VE4 and the functional group ratio of the mole number of the hydroxyl group with respect to the mole number of the ethylenically unsaturated group per 1 g were as described in Table 1.

Subsequently, 50 parts by weight of B-VE, 0.5 part by weight of INT-A, 0.5 part by weight of INT-B, 0.35 part by weight of a phosphoric acid ester-based derivative composition (manufactured by Axel Plastics Research Laboratories, Inc., trade name: MOLD WIZ INT-EQ-6) as an internal mold release agent, and 5 parts by mass of milled carbon fibers (manufactured by Nippon Polymer Sangyo Co., Ltd., trade name: MP30X, the content of fibers having a weight average fiber length of 95 μm and 350 μm or less being 99 mass %) were added to the obtained mN-VE4 and the resulting mixture was sufficiently stirred to thereby obtain a resin pre-paste.

A plurality of resin pre-pastes thus obtained were prepared, pNCO was added to each resin pre-paste while the amount of pNCO added was changed, and the resulting mixtures were sufficiently stirred to thereby obtain resin pastes. These resin pastes were aged for 7 days under the atmosphere at 25° C., and then viscosity (aging viscosity), solubility, and handleability were evaluated. Evaluation results are presented in Table 2.

Example 5

Resin pastes were obtained by performing the similar operation to Example 4, except that the amount of mNCO added was changed to 9.6 parts by weight. These resin pastes were aged for 7 days under the atmosphere at 25° C., and then viscosity (aging viscosity), solubility, and handleability were evaluated. Evaluation results are presented in Table 2.

Example 6

Resin pastes were obtained by performing the similar operation to Example 4, except that the amount of N-VE added was changed to 35 parts by weight, the amount of mNCO added was changed to 4.0 parts by weight, and the amount of B-VE added was changed to 65 parts by weight. These resin pastes were aged for 7 days under the atmosphere at 25° C., and then viscosity (aging viscosity), solubility, and handleability were evaluated. Evaluation results are presented in Table 3.

Examples 7 and 8

Resin pastes were obtained by performing the similar operation to Example 6, except that the amount of mNCO added was changed to 6.7 parts by weight or 9.4 parts by weight. These resin pastes were aged for 7 days under the atmosphere at 25° C., and then viscosity (aging viscosity), solubility, and handleability were evaluated. Evaluation results are presented in Table 3.

Comparative Example 1

100 parts by weight of N-VE, 0.02 part by weight of 1,4-benzoquinone as a stabilizing agent, 0.5 part by weight of INT-A, 0.5 part by weight of INT-B, 0.35 part by weight of a phosphoric acid ester-based derivative composition (manufactured by Axel Plastics Research Laboratories, Inc., trade name: MOLD WIZ INT-EQ-6) as an internal mold release agent, and 5 parts by mass of milled carbon fibers (manufactured by Nippon Polymer Sangyo Co., Ltd., trade name: MP30X, the content of fibers having a weight average fiber length of 95 μm and 350 μm or less being 99 weight %) were mixed and sufficiently stirred to thereby obtain a resin pre-paste.

A plurality of resin pre-pastes thus obtained were prepared, pNCO was added to each resin pre-paste while the amount of pNCO added was changed, and the resulting mixtures were sufficiently stirred to thereby obtain resin pastes. These resin pastes were aged for 7 days under the atmosphere at 25° C., and then viscosity (aging viscosity), solubility, and handleability were evaluated. Evaluation results are presented in Table 4.

Comparative Example 2

Resin pastes were obtained by performing the similar operation to Comparative Example 1, except that N-VE was changed from 100 parts by weight to 50 parts by weight and 50 parts by weight of B-VE was added. These resin pastes were aged for 7 days under the atmosphere at 25° C., and then viscosity (aging viscosity), solubility, and handleability were evaluated. Evaluation results are presented in Table 4.

Comparative Example 3

Resin pastes were obtained by performing the similar operation to Comparative Example 1, except that N-VE was changed from 100 parts by weight to 35 parts by weight and 65 parts by weight of B-VE was added. These resin pastes were aged for 7 days under the atmosphere at 25° C., and then viscosity (aging viscosity), solubility, and handleability were evaluated. Evaluation results are presented in Table 4.

[Analysis Method]
(Disappearance Confirmation of Isocyanate Group)

Confirmation of disappearance of the monoisocyanate group was carried out by the following method. Produced mN-VE and mNCO were prepared, and the both components were dissolved in a small amount of a chloroform solution, respectively. Subsequently, the chloroform solution was coated on a NaCl plate, and then measurement was performed after evaporation of chloroform was confirmed. An apparatus used in measurement was a Fourier-transform infrared spectrometer NICOLET 4700 (Thermo Electron Corporation) and the cumulated number at the time of evaluation was eight.

Existence of a peak near 2,260 cm$^{-1}$ derived from the NCO group was confirmed by taking a difference between spectra of the obtained mN-VE and mNCO.

[Evaluation Method]

By evaluating the characteristics of the resin paste not containing the component (C), the fluidity and handleability of the SMC obtained from the resin paste can be estimated with a high degree of accuracy. For example, whether or not the resin paste can be handled as the SMC can be determined from the handleability evaluation of the resin paste. In addition, whether or not the fluidity is allowable at the time of obtaining an SMC can be determined from the solubility evaluation of the resin paste. Further, by measuring the viscosity of the resin paste, the viscosity value can be used as a barometer of adequacy determination on the handleability and solubility of the resin paste. However, the resin paste viscosity is merely a numerical barometer, and determination on the resin for the SMC is performed in comprehensive consideration of the handleability evaluation and the solubility evaluation.

(Viscosity Measurement)

The measurement of the viscosity of the resin paste aged for 7 days under the atmosphere at 25° C. was performed using a digital viscometer HB DV-1 prime (manufactured by Brookfield Engineering) equipped with T-Bar spindle T-F under the same atmosphere. Incidentally, as the viscosity, numerical values at the stage at a time of 90 s to 120 s from the liquid surface of the resin paste were used. Further, the measurement was performed by setting the number of rotations of the spindle in a range of 0.3 rpm to 50 rpm and adjusting the number of rotations of the spindle such that a torque at the time of measurement would be in a range of 10% to 90%, preferably in a range of 30% to 50%.

Whether or not solubility evaluation and handleability evaluation are performed was determined from the following criteria on the basis of the obtained numerical values. Incidentally, in a case where it is obvious that the viscosity is significantly low, the viscosity measurement and other evaluations were not performed.

Sorting Criteria

"Less than 1,000,000 cP": not performing solubility evaluation and handleability evaluation "1,000,000 cP or more and 100,000,000 cP or less": performing solubility evaluation and handleability evaluation "More than 100,000,000 cP": not performing solubility evaluation and handleability evaluation (Meltability)

About 1 g to 5 g of a resin paste piece was cut out from the inside of the resin paste, excluding a 1 cm thick part from the surface layer of the resin paste aged for 7 days under the atmosphere at 25° C. The resin paste piece was left to stand still on a heating disc set at 140° C., the solubility behavior when the resin paste was concentrically moved while being pressed by a spatula was confirmed, and determination was performed based on the following indices.

Evaluation Criteria

"⊙": A uniform resin coating film can be formed.

"○". Undissolved components are found, but a coating film can be formed.

"Δ": Undissolved components are attached to the heating disc, but a coating is not formed.

"x": Undissolved components are not attached to the heating disc.

(Handleability)

Handleability was determined based on whether or not the resin paste is attached to a glove when an operator holds by a hand about 5 to 20 g of a resin paste piece cut out from the inside of the resin paste, excluding 1 cm of the surface layer of the resin paste aged for 7 days under the atmosphere at 25° C. The determination indices are as follows.

Evaluation Criteria

"⊙": There is no attachment to the glove, a sufficient stiffness is achieved at the time of obtaining an SMC, and favorable handleability can be expected.

"○": There is no attachment to the glove, stiffness is slightly weak at the time of obtaining an SMC, but favorable handleability can be expected.

"○Δ": There is no attachment to the glove, stiffness is weak at the time of obtaining an SMC, but it can be expected that the SMC can be handled.

"Δ": The resin paste can be cut out, but attachment to the glove is confirmed.

"Δx": The resin paste can be cut out but is difficult to cut, and attachment to the glove is confirmed or in a case where work environment is 35° C. or higher, the SMC is soft and thus conveyance becomes cumbersome or adhesive force to a glove, a work station, or the like is too strong so that handling is difficult.

"x": The resin paste cannot be cut out and attachment to the glove is confirmed.

(Comprehensive Evaluation)

The viscosity was regarded as a reference value, and from the results of the handleability evaluation and the solubility evaluation, in the case of having the evaluation results of handleability "○Δ" or higher and solubility "○" or higher, a product was determined to be suitably used as the SMC.

As presented in Tables 1 to 4, it was found that by controlling the hydroxyl value and the functional group ratio of the novolac vinyl ester resin to the ranges defined in the invention, the addition range of pNCO in which the balance between handleability and solubility can be achieved is expanded (Examples 1 to 3). This is shown from comparison between Examples 1 to 3 and Comparative Example 1 which are systems using the same amount of N-VE as a starting material. Further, it was found that by concurrently using the novolac vinyl ester resin and the bisphenol A type vinyl ester resin, the addition range of pNCO in which the balance between handleability and solubility can be achieved is significantly expanded (Examples 4 to 8). This is shown from comparison between Examples 4 and 5 and Comparative Example 2 and comparison between Examples 6 to 8 and Comparative Example 3 using the same amount of N-VE as a starting material.

On the other hand, in a case where the hydroxyl value and the functional group ratio of the novolac vinyl ester resin are out of the ranges defined in the invention, it was difficult to achieve the balance between handleability and solubility (Comparative Example 1). Further, even by concurrently using the novolac vinyl ester resin and the bisphenol A type vinyl ester resin, the addition range in which the balance between handleability and solubility can be achieved was narrow and it was difficult to receive lot contact of each vinyl ester resin (Comparative Examples 2 and 3).

TABLE 1

| | | | Example 1 | Example 2 | Example 3 |
|---|---|---|---|---|---|
| Mixture of components (A') and (B) | Incorporation N-VE | Component (A') [parts by weight] | 68 | 68 | 68 |
| | | Component (B) [parts by weight] | 32 | 32 | 32 |
| | mNCO | Component (E) [parts by weight] | 11.5 | 19.1 | 26.8 |
| | | Hydroxyl value of component (A) [mgKOH/g] | 133.9 | 87.2 | 48.1 |
| | | Functional group ratio of component (A) [—] | 0.54 | 0.33 | 0.18 |
| | | Hydroxyl value of mixture of (A) and (B) [mgKOH/g] | 95.5 | 63.8 | 36.0 |
| | | Amount of hydroxyl group contained in mixture [mgKOH] | 10,640 | 7,600 | 4,560 |
| Mixture of components (F) and (B) | B-VE | Component (F) [parts by weight] | | | |
| | | Component (B) [parts by weight] | | | |
| | | Hydroxyl value of component (F) [mgKOH/g] | | | |
| | | Amount of hydroxyl group contained in mixture [mgKOH] | | | |
| Mixture of components (A'), (F), and (B) | | Amount of hydroxyl group contained in mixture [mgKOH] | 10,640 | 7,600 | 4,560 |
| | | Hydroxyl value of mixture [mgKOH/g] | 95.5 | 63.8 | 36.0 |
| Component (G) | | INT-A [parts by weight] | 0.5 | 0.5 | 0.5 |
| | | INT-B [parts by weight] | 0.5 | 0.5 | 0.5 |

| | | | Example 1 | | | Example 2 | | | Example 3 | | |
|---|---|---|---|---|---|---|---|---|---|---|---|
| | | | Aging viscosity | Handleability | Solubility | Aging viscosity | Handleability | Solubility | Aging viscosity | Handleability | Solubility |
| Component (D) | pNCO | 12 [parts by weight] | 4,200,000 | X | O | | | | | | |
| | | 12.5 | 42,200,000 | O△ | O | | | | 500,000 | △ | O |
| | | 13 | 37,900,000 | O | △ | 700,000 | △ | ⊙ | 2,100,000 | O△ | O |
| | | 13.5 | 41,000,000 | O | X | | | | 7,400,000 | O | ⊙ |
| | | 14 | 30,900,000 | O | X | 3,300,000 | O△ | ⊙ | 15,000,000 | O | O |
| | | 14.5 | | | | 68,000,000 | O | ⊙ | 95,200,000 | O | O |
| | | 15 | 27,000,000 | O | X | 68,600,000 | O | O | 51,500,000 | O | △ |
| | | 15.5 | | | | 65,600,000 | O | △ | | | |
| | | 16 | 37,000,000 | O | X | 59,200,000 | O | X | 57,600,000 | O | X |
| | | 16.5 | | | | | | | | | |

TABLE 2

| | | | | | Example 4 | Example 5 |
|---|---|---|---|---|---|---|
| Mixture of components (A) and (B) | Incorporation | N-VE | Component (A') | [parts by weight] | 34.0 | 34.0 |
| | | | Component (B) | [parts by weight] | 16.0 | 16.0 |
| | | mNCO | Component (E) | [parts by weight] | 7.6 | 9.6 |
| | Hydroxyl value of component (A) | | | [mgKOH/g] | 109.5 | 87.2 |
| | Functional group ratio of component (A) | | | [—] | 0.43 | 0.33 |
| | Hydroxyl value of mixture of (A) and (B) | | | [mgKOH/g] | 79.1 | 63.8 |
| | Amount of hydroxyl group contained in mixture | | | [mgKOH] | 4,560 | 3,800 |
| Mixture of components (F) and (B) | B-VE | | Component (F) | [parts by weight] | 34.0 | 34.0 |
| | | | Component (B) | [parts by weight] | 16.0 | 16.0 |
| | Hydroxyl value of component (F) | | | [mgKOH/g] | 148.5 | 148.5 |
| | Amount of hydroxyl group contained in mixture | | | [mgKOH] | 5,050.0 | 5,050.0 |
| Mixture of components (A'), (F), and (B) | Amount of hydroxyl group contained in mixture | | | [mgKOH] | 9,610 | 8,850 |
| | Hydroxyl value of mixture | | | [mgKOH/g] | 89.3 | 80.8 |
| Component (G) | | | INT-A | [parts by weight] | 0.5 | 0.5 |
| | | | INT-B | [parts by weight] | 0.5 | 0.5 |

| | | | | | Aging viscosity | Handle-ability | Solubility | Aging viscosity | Handle-ability | Solubility |
|---|---|---|---|---|---|---|---|---|---|---|
| Component (D) | pNCO | 12 | | [parts by weight] | | | | | | |
| | | 12.5 | | | | | | | | |
| | | 13 | | | 10,000 | X | ⊙ | | | |
| | | 13.5 | | | | | | | | |
| | | 14 | | | 6,000,000 | ⊙ | ⊙ | | | |
| | | 14.5 | | | | | | | | |
| | | 15 | | | 20,000,000 | ⊙ | ⊙ | 1,400,000 | X | ⊙ |
| | | 15.5 | | | | | | 3,400,000 | ○△ | ⊙ |
| | | 16 | | | 61,600,000 | ⊙ | △ | 8,200,000 | ⊙ | ⊙ |
| | | 16.5 | | | | | | 52,900,000 | ⊙ | ○ |

TABLE 3

| | | | | Example 6 | | | Example 7 | | | Example 8 | | |
|---|---|---|---|---|---|---|---|---|---|---|---|---|
| Mixture of components (A) and (B) | Incorporation | N-VE | Component (A') | [parts by weight] | 23.8 | | | 23.8 | | | 23.8 | | |
| | | | Component (B) | [parts by weight] | 11.2 | | | 11.2 | | | 11.2 | | |
| | | mNCO | Component (E) | [parts by weight] | 4.0 | | | 6.7 | | | 9.4 | | |
| | Hydroxyl value of component (A) | | | [mgKOH/g] | 133.9 | | | 87.2 | | | 48.1 | | |
| | Functional group ratio of component (A) | | | [—] | 0.54 | | | 0.33 | | | 0.18 | | |
| | Hydroxyl value of mixture of (A) and (B) | | | [mgKOH/g] | 95.5 | | | 63.8 | | | 36.0 | | |
| | Amount of hydroxyl group contained in mixture | | | [mgKOH] | 3,724 | | | 2,660 | | | 1,596 | | |
| Mixture of components (F) and (B) | B-VE | | Component (F) | [parts by weight] | 44.2 | | | 44.2 | | | 44.2 | | |
| | | | Component (B) | [parts by weight] | 20.8 | | | 20.8 | | | 20.8 | | |
| | Hydroxyl value of component (F) | | | [mgKOH/g] | 148.5 | | | 148.5 | | | 148.5 | | |
| | Amount of hydroxyl group contained in mixture | | | [mgKOH] | 6,565.0 | | | 6,565.0 | | | 6,565.0 | | |
| Mixture of components (A'), (F), and (B) | Amount of hydroxyl group contained in mixture | | | [mgKOH] | 10,289 | | | 9,225 | | | 8,161 | | |
| | Hydroxyl value of mixture | | | [mgKOH/g] | 98.9 | | | 86.5 | | | 74.6 | | |
| Component (G) | INT-A | | | [parts by weight] | 0.5 | | | 0.5 | | | 0.5 | | |
| | INT-B | | | [parts by weight] | 0.5 | | | 0.5 | | | 0.5 | | |

| | | | Aging viscosity | Handleability | Solubility | Aging viscosity | Handleability | Solubility | Aging viscosity | Handleability | Solubility |
|---|---|---|---|---|---|---|---|---|---|---|---|
| Component (D) | pNCO | [parts by weight] | | | | | | | | | |
| | 12 | | 1,100,000 | X | ⊙ | | | | | | |
| | 12.5 | | 2,700,000 | ○△ | ⊙ | | | | | | |
| | 13 | | 4,100,000 | ○ | ⊙ | 2,700,000 | △X | ⊙ | | | |
| | 13.5 | | 10,500,000 | ○ | ⊙ | 3,500,000 | ○△ | ⊙ | | | |
| | 14 | | 67,500,000 | ⊙ | ○ | 10,200,000 | ○ | ⊙ | 1,800,000 | X | ⊙ |
| | 14.5 | | | | | 20,100,000 | ⊙ | ⊙ | 4,000,000 | ○△ | ⊙ |
| | 15 | | | | | 40,500,000 | ⊙ | ○ | 8,000,000 | ○ | ⊙ |
| | 15.5 | | | | | 70,700,000 | ⊙ | ○ | | | |
| | 16 | | 87,700,000 | ⊙ | △ | 92,000,000 | ⊙ | X | 89,300,000 | ⊙ | ⊙ |
| | 16.5 | | | | | | | | | | |

TABLE 4

|  |  |  |  | Comparative Example 1 | Comparative Example 2 |
|---|---|---|---|---|---|
| Mixture of components (A') and (B) | N-VE | Component (A') | [parts by weight] | 68 | 34.0 |
|  |  | Component (B) | [parts by weight] | 32 | 16.0 |
|  |  | Hydroxyl value of component (A') | [mgKOH/g] | 223.5 | 223.5 |
|  |  | Functional group ratio of component (A') | [—] | 1.00 | 1.00 |
|  |  | Hydroxyl value of mixture of (A') and (B) | [mgKOH/g] | 152.0 | 152.0 |
|  |  | Amount of hydroxyl group contained in mixture | [mgKOH] | 15,200 | 7,600 |
| Mixture of components (F) and (B) | B-VE | Component (F) | [parts by weight] | 0 | 34.0 |
|  |  | Component (B) | [parts by weight] | 0 | 16.0 |
|  |  | Hydroxyl value of component (F) | [mgKOH/g] | 0 | 148.5 |
|  |  | Amount of hydroxyl group contained in mixture | [mgKOH] | 0 | 5,050 |
| Mixture of components (A'), (F), and (B) |  | Amount of hydroxyl group contained in mixture | [mgKOH] | 15,200 | 12,650 |
|  |  | Hydroxyl value of mixture | [mgKOH/g] | 152.0 | 126.5 |
| Component (G) |  | INT-A | [parts by weight] | 0.5 | 0.5 |
|  |  | INT-B | [parts by weight] | 0.5 | 0.5 |

|  |  |  |  | Aging viscosity | Handleability | Solubility | Aging viscosity | Handleability | Solubility |
|---|---|---|---|---|---|---|---|---|---|
| Component (D) | pNCO | 9 | [parts by weight] | 400,000 | X |  |  |  |  |
|  |  | 9.5 |  | 35,000,000 | ○ | Δ |  |  |  |
|  |  | 10 |  | 32,200,000 | ○ | Δ |  |  |  |
|  |  | 10.5 |  | 35,400,000 | ○ | X | 10,000 | X | ⊙ |
|  |  | 11 |  | 41,000,000 | ○ | X | 9,200,000 | Δ | ○ |
|  |  | 11.5 |  | 40,000,000 | ○ | X | 40,000,000 | ⊙ | Δ |
|  |  | 12 |  |  |  |  | 46,200,000 | ⊙ | X |
|  |  | 12.5 |  |  |  |  |  |  |  |

|  |  |  |  | Comparative Example 3 |
|---|---|---|---|---|
| Mixture of components (A') and (B) | N-VE | Component (A') | [parts by weight] | 23.8 |
|  |  | Component (B) | [parts by weight] | 11.2 |
|  |  | Hydroxyl value of component (A') | [mgKOH/g] | 223.5 |
|  |  | Functional group ratio of component (A') | [—] | 1.00 |
|  |  | Hydroxyl value of mixture of (A') and (B) | [mgKOH/g] | 152.0 |
|  |  | Amount of hydroxyl group contained in mixture | [mgKOH] | 5,320 |
| Mixture of components (F) and (B) | B-VE | Component (F) | [parts by weight] | 44.2 |
|  |  | Component (B) | [parts by weight] | 20.8 |
|  |  | Hydroxyl value of component (F) | [mgKOH/g] | 148.5 |
|  |  | Amount of hydroxyl group contained in mixture | [mgKOH] | 6,565 |
| Mixture of components (A'), (F), and (B) |  | Amount of hydroxyl group contained in mixture | [mgKOH] | 11,885 |
|  |  | Hydroxyl value of mixture | [mgKOH/g] | 118.9 |
| Component (G) |  | INT-A | [parts by weight] | 0.5 |
|  |  | INT-B | [parts by weight] | 0.5 |

TABLE 4-continued

|  |  |  |  |  | Aging viscosity | Handleability | Solubility |
|---|---|---|---|---|---|---|---|
| Component (D) | pNCO | 9 | [parts by weight] |  |  |  |  |
|  |  | 9.5 |  |  |  |  |  |
|  |  | 10 |  |  |  |  |  |
|  |  | 10.5 |  |  |  |  |  |
|  |  | 11 |  |  |  |  |  |
|  |  | 11.5 |  |  | 2,900,000 | X | ○ |
|  |  | 12 |  |  | 27,200,000 | Δ | ○ |
|  |  | 12.5 |  |  | 52,800,000 | ⊙ | X |

INDUSTRIAL APPLICABILITY

The invention can be used in electrical and electronic equipment, building materials, members for vehicles, and the like.

The invention claimed is:

1. A sheet-molding compound, comprising:
a thickened product of a thermosetting resin composition; and
a component (C): a reinforced fiber bundle having a fiber length of 5 to 120 mm,
wherein the thermosetting resin composition includes
a component (A): a novolac vinyl ester resin having a hydroxyl group and an ethylenically unsaturated group in the molecule,
a component (B): an ethylenically unsaturated monomer, and
a component (D): polyisocyanate,
wherein the component (A) has a hydroxyl value of 150 mgKOH/g or less and a ratio X/Y of less than 1, where X is an amount in mole number of the hydroxyl group per 1 g of the component (A), and Y is an amount in mole number of the ethylenically unsaturated group per 1 g of the component (A), and
the component (A) comprises
a modified novolac vinyl ester resin obtained by reacting a component (E): monoisocyanate with a component (A'): an unmodified novolac vinyl ester resin having a hydroxyl group and an ethylenically unsaturated group in the molecule and having a hydroxyl value of more than 150 mgKOH/g.

2. A method for producing the sheet-molding compound according to claim 1, comprising:
dissolving the component (A') in the component (B) such that a mixture of the components (A') and (B) is obtained;
mixing the component (E) with the mixture such that a reaction occurs and produces a reaction product;
mixing the component (D) with the reaction product such that a thermosetting resin composition is obtained;
impregnating the thermosetting resin composition in the component (C) such that a sheet-molding compound precursor is obtained; and
thickening the thermosetting resin composition in the sheet-molding compound precursor,
wherein the reaction product includes the component (A).

3. The method according to claim 2, wherein the component (A') has a hydroxyl value of more than 150 mgKOH/g and 340 mgKOH/g or less, and an isocyanate group of the component (E) is reacted in an amount of 15 mol % or more and 80 mol % or less with respect to a total of hydroxyl groups of the component (A').

4. The method according to claim 3, wherein the component (E) is unsaturated isocyanate having one isocyanate group and at least one ethylenically unsaturated group in the same molecule.

5. The method according to claim 3, further comprising: mixing an inorganic filler after completion of reaction between the component (A') and the component (E).

6. The method according to claim 2, further comprising: mixing with the mixture a component (F): a bisphenol type vinyl ester resin.

7. The method according to claim 6, further comprising: mixing an inorganic filler after completion of reaction between the component (A') and the component (E).

8. The method according to claim 2, wherein the component (E) is unsaturated isocyanate having one isocyanate group and at least one ethylenically unsaturated group in the same molecule.

9. The method according to claim 2, further comprising: mixing an inorganic filler after completion of reaction between the component (A') and the component (E).

10. A fiber-reinforced composite material, comprising a cured product of the sheet-molding compound according to claim 1.

11. The sheet-molding compound according to claim 1, wherein the hydroxyl value of the component (A) is 30 mgKOH/g or more and 150 mgKOH/g or less, and the ratio X/Y is 0.1 or more and 0.8 or less in the thermosetting resin composition.

12. The sheet-molding compound according to claim 1, wherein the mole number of the ethylenically unsaturated group per 1 g of the component (A) is 2.5 mmol/g or more and 6.0 mmol/g or less in the thermosetting resin composition.

13. The sheet-molding compound according to claim 1, wherein the component (A) has one or more urethane bonds in the molecule in the thermosetting resin composition.

14. The sheet-molding compound according to claim 13, wherein the component (A) has a novolac skeleton into which the ethylenically unsaturated group is introduced via the urethane bond in the thermosetting resin composition.

15. The sheet-molding compound according to claim 1, wherein the component (E) comprises unsaturated isocyanate having one isocyanate group and at least one ethylenically unsaturated group in the same molecule.

16. The sheet-molding compound according to claim 1, wherein the thermosetting resin composition further comprises a component (F): a bisphenol type vinyl ester resin or a modified bisphenol type vinyl ester resin.

17. The sheet-molding compound according to claim 1, wherein the thermosetting resin composition further comprises a component (G): a polymerization initiator.

18. The sheet-molding compound according to claim 1, wherein the thermosetting resin composition further comprises an inorganic filler.

19. The sheet-molding compound according to claim 1, wherein the hydroxyl value of the component (A) is 100 mgKOH/g or less.

\* \* \* \* \*